US012043066B2

(12) United States Patent
Ferigo et al.

(10) Patent No.: US 12,043,066 B2
(45) Date of Patent: Jul. 23, 2024

(54) TIRE HAVING A REINFORCED LOWER ZONE

(71) Applicant: COMPAGNIE GENERALE DES ETABLISSEMENTS MICHELIN, Clermont-Ferrand (FR)

(72) Inventors: Herve Ferigo, Clermont-Ferrand (FR); Pascal Prost, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 51 days.

(21) Appl. No.: 16/652,763

(22) PCT Filed: Oct. 1, 2018

(86) PCT No.: PCT/FR2018/052408
§ 371 (c)(1),
(2) Date: Apr. 1, 2020

(87) PCT Pub. No.: WO2019/069002
PCT Pub. Date: Apr. 11, 2019

(65) Prior Publication Data
US 2020/0231012 A1    Jul. 23, 2020

(30) Foreign Application Priority Data
Oct. 2, 2017   (FR) ........................................ 1759177

(51) Int. Cl.
*B60C 15/06*   (2006.01)
(52) U.S. Cl.
CPC .................... *B60C 15/0628* (2013.01); *B60C 2015/0642* (2013.01); *B60C 2015/0646* (2013.01); *B60C 2015/065* (2013.01)

(58) Field of Classification Search
CPC ................ B60C 15/0628; B60C 15/06; B60C 2015/0617; B60C 2015/0621;
(Continued)

(56) References Cited

U.S. PATENT DOCUMENTS

| 4,854,362 A | 8/1989 | Carolla et al. |
| 5,529,104 A * | 6/1996 | Delias ....................... B60C 9/09 |
| | | 152/456 |

(Continued)

FOREIGN PATENT DOCUMENTS

| EP | 2116398 A1 | 11/2009 |
| JP | 61057405 A * | 3/1986 ............. B60C 15/06 |

(Continued)

OTHER PUBLICATIONS

International Search Report dated Jan. 11, 2019, in corresponding PCT/FR2018/052408 (4 pages).
Copending U.S. Appl. No. 16/956,892, filed Jan. 22, 2021.

Primary Examiner — Cedrick S Williams
(74) Attorney, Agent, or Firm — VENABLE LLP

(57) ABSTRACT

A tire for a motor vehicle comprising: two beads (20); two sidewalls (30) meeting at a crown (25); at least one carcass reinforcement (160) extending from the beads (20) through the sidewalls (30) as far as the crown (25), the carcass reinforcement (160) having a plurality of carcass reinforcing elements and anchored in the two beads (20) by a turn-up around the annular reinforcing structure (70), so as to form in each bead a main strand (162) and a turn-up strand (163); and a stiffening reinforcement (140) arranged in at least one sidewall of the tire, said stiffening reinforcement (140) having a radially inner end (141) and a radially outer end (142), the stiffening reinforcement being formed of a plurality of stiffening elements oriented at an angle less than or equal to 10° relative to a circumferential direction of the tire.

11 Claims, 5 Drawing Sheets

(58) Field of Classification Search
CPC .... B60C 2015/0639; B60C 2015/0642; B60C 2015/0646; B60C 2015/065
See application file for complete search history.

(56) References Cited

U.S. PATENT DOCUMENTS

| | | |
|---|---|---|
| 7,556,076 B2 | 7/2009 | Prost et al. |
| 9,649,891 B2 | 5/2017 | Bourgeois |
| 9,744,812 B2 | 8/2017 | Bourgeois |
| 2003/0145935 A1 | 8/2003 | Prost et al. |
| 2007/0137759 A1 | 6/2007 | Roppitsch et al. |
| 2010/0089514 A1 | 4/2010 | Fukushima et al. |
| 2012/0325390 A1 | 12/2012 | Bourgeois |
| 2015/0020945 A1 | 1/2015 | Bourgeois |
| 2017/0021677 A1* | 1/2017 | Le Clerc ................ B29D 30/72 |
| 2020/0316999 A1 | 10/2020 | Rih et al. |

FOREIGN PATENT DOCUMENTS

| | | | | |
|---|---|---|---|---|
| JP | 11170807 A | * | 6/1999 | |
| JP | 2002-347409 | * | 12/2002 | ............... B60C 9/08 |
| JP | 2003-226118 A | | 8/2003 | |
| JP | 2003-312208 A | | 11/2003 | |
| JP | 2009-149176 A | | 7/2009 | |
| JP | 2011-16400 A | | 1/2011 | |
| JP | 2014223833 A | * | 12/2014 | |
| WO | 02/09956 A1 | | 2/2002 | |
| WO | 2011/067211 A2 | | 6/2011 | |
| WO | 2013/127680 A1 | | 9/2013 | |
| WO | 2014/019939 A1 | | 2/2014 | |

\* cited by examiner

TIRE HAVING A REINFORCED LOWER ZONE

FIELD OF THE INVENTION

The present invention relates to tyres for motor vehicles, in particular passenger vehicles having four wheels.

PRIOR ART

Reducing greenhouse gas emissions in the field of transport is one of the major challenges facing vehicle manufacturers today. Tyres constitute a significant source of progress, through a reduction in rolling resistance, because this has a direct impact on the fuel consumption of the vehicle.

However, the assembly formed by the bead and the radially inner part of the sidewall of a tyre is one of the tyre components of which the structure has a very marked impact on the rolling resistance of the tyre. It has multiple roles: it takes up the tension in the carcass reinforcement and transmits the loads applied to the tyre from the sidewall to the rim. It therefore guides the crown of the tyre from the rim. Its influence on the roadholding of the tyre is considerable, especially when the tyre is highly loaded. All of these functions are usually performed by the combination of a reinforcement (comprising the bead wire and the turn-up of the carcass reinforcement around this bead wire) and a "filler" made of a rubber composition. The compromise between the stiffness to be achieved, particularly for guiding the crown, and the expected endurance generally leads to a certain path being provided for the carcass reinforcement and use being made of a filler that is bulky (tall and/or thick) and very rigid (approximately 50 MPa). The downside of this geometry is a significant hysteresis loss, in particular in the filler. The stiffening action of the filler is exerted especially in the zone remote from the bead and therefore involves a filler that is even bulkier and consequently an even greater hysteresis loss, which is detrimental to the rolling resistance of the tyre.

Tyres have thus been proposed that have a structure aimed at reducing the use of these rigid rubbers in order to achieve improved rolling resistance. However, the structures proposed tend to greatly reduce the overall stiffness of the tyre, and this may be detrimental, in particular in terms of roadholding and most particularly with a view to approval by motor vehicle manufacturers.

In order to overcome this problem, it has been proposed to reduce the volume of rigid rubber used in the lower zone of the tyre and to compensate for this reduction in rigid rubber by adding a reinforcing structure in this lower zone of the tyre. Tyre structures have therefore been developed according to this principle, and mention may be made of those described for example in the international application published on 9 Jun. 2011 under the reference WO2011/067211, in the international application published on 6 Sep. 2013 under the reference WO2013/127680, or in the international application published on 6 Feb. 2014 under the reference WO2014/019939. These solutions are advantageous in terms of improving the stiffness/rolling resistance compromise as mentioned above, but could be further optimized and/or simplified. Furthermore, these solutions make it possible to reduce the rolling resistance while retaining the lateral stiffness, but they could be further improved as regards cornering stiffness.

An aim of the present invention is therefore to propose a tyre, in particular a tyre for a passenger vehicle having four wheels, which has low rolling resistance while having a satisfactory overall stiffness, in particular lateral stiffness and cornering stiffness.

Another aim of the present invention is to propose a tyre, in particular a tyre for a passenger vehicle having four wheels, which exhibits a satisfactory stiffness/rolling resistance compromise that does not reduce the endurance of the tyre, and which may furthermore be manufactured simply.

SUMMARY OF THE INVENTION

To this end, a tyre for a motor vehicle is proposed, comprising:
- two beads intended to come into contact with a mounting rim, each bead comprising at least one annular reinforcing structure, each annular reinforcing structure having a radially innermost point;
- two sidewalls extending the beads radially outwards, the two sidewalls meeting at a crown comprising a crown reinforcement having at least one ply provided with crown reinforcing elements, the crown reinforcement being furthermore surmounted by a tread;
- at least one carcass reinforcement extending from the beads through the sidewalls as far as the crown, the carcass reinforcement having a plurality of carcass reinforcing elements and being anchored in the two beads by a turn-up around the annular reinforcing structure, so as to form in each bead a main strand and a turn-up strand,
- a stiffening reinforcement arranged in at least one sidewall of the tyre, said stiffening reinforcement having a radially inner end and a radially outer end, the stiffening reinforcement being formed of a plurality of stiffening elements oriented at an angle less than or equal to 10° relative to a circumferential direction of the tyre, characterized in that
- each turn-up strand of the carcass reinforcement extends radially outwards as far as an end situated at a radial distance DRE from the radially innermost point of the annular reinforcing structure of the bead, the radial distance DRE being greater than 20% and less than or equal to 95% of a radial height H of the tyre;
- at least a portion of the carcass reinforcement comprises crossed reinforcing elements oriented at an angle of between 70° and 80° relative to the circumferential direction; and
- said stiffening reinforcement is arranged such that the radial distance DRR between the radially inner end and the radially outer end is at least equal to 10% of the radial distance DRE from the turn-up strand of the corresponding sidewall.

Preferred but non-limiting aspects of this tyre, taken individually or in combination, are as follows:
- the crossed reinforcing elements of the carcass reinforcement are arranged so as to form the turn-up strand and/or at least a portion of the main strand.
- the crossed reinforcing elements of the carcass reinforcement are arranged so as to form the turn-up strand and a portion of the main strand that is adjacent to said turn-up strand.
- the portion of the main strand that is not adjacent to said turn-up strand is formed of non-crossed reinforcing elements oriented at an angle of approximately 90° relative to the circumferential direction.
- the crossed reinforcing elements of the carcass reinforcement are oriented at an angle of between 75° and 80° relative to the circumferential direction.

the carcass reinforcement comprises crossed reinforcing elements oriented at opposite angles relative to the circumferential direction.

the crossed reinforcing elements of the carcass reinforcement are radially inside the radially outer end of the stiffening reinforcement.

the stiffening reinforcement is positioned axially between the main strand and the turn-up strand of the corresponding sidewall.

the stiffening reinforcement is positioned axially on the outside relative to the turn-up strand of the corresponding sidewall.

the stiffening reinforcement is positioned axially on the inside relative to the main strand of the corresponding sidewall.

the stiffening reinforcement is arranged so as to be at least partially adjacent to the turn-up strand of the corresponding sidewall.

the stiffening reinforcement is arranged so as to be entirely adjacent to the turn-up strand of the corresponding sidewall.

the stiffening reinforcement is arranged so as not to be adjacent to the turn-up strand of the corresponding sidewall.

the stiffening elements of the stiffening reinforcement comprise textile and/or metallic threads.

the stiffening elements of the stiffening reinforcement are formed from metallic or textile cords.

the stiffening elements of the stiffening reinforcement are formed from threads manufactured from a non-elastomeric material chosen from a polyester, a polyamide, a polyketone, a polyvinyl alcohol, a cellulose, a mineral fibre, a natural fibre or a mixture of these materials.

the stiffening elements of the stiffening reinforcement are in the form of strips.

the strips have a thickness of approximately 1 mm and a width of approximately 10 mm.

the stiffening elements of the stiffening reinforcement are split, preferably by mechanical cutting or laser cutting.

the stiffening elements of the stiffening reinforcement are spaced apart by a regular pitch, preferably a pitch of approximately 1 mm.

the stiffening elements of the stiffening reinforcement are embedded in a rubber composition having a modulus MA10 of less than 10 MPa, and preferably between 2 MPa and 6 MPa.

the stiffening elements are oriented at an angle of approximately zero degrees relative to the circumferential direction of the tyre.

DESCRIPTION OF THE FIGURES

Further features and advantages of the invention will become more apparent from the following description, which is purely illustrative and non-limiting and should be read in conjunction with the appended drawings, in which.

DETAILED DESCRIPTION OF THE INVENTION

Figure 1:
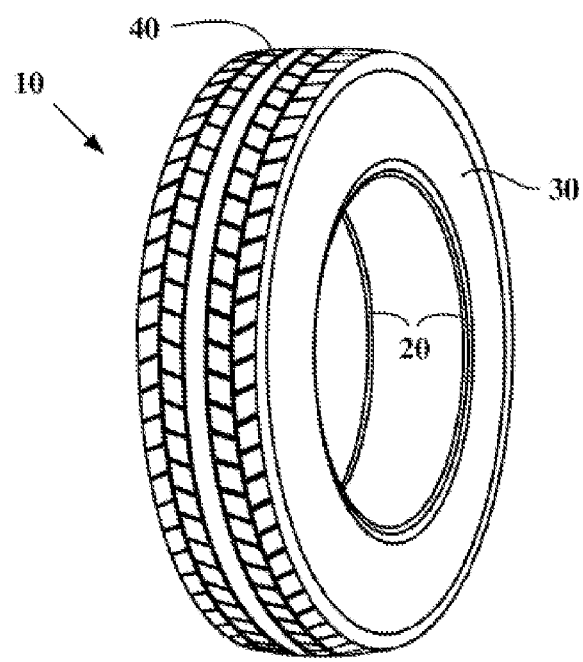
FIG. 1 shows a conventional tyre.

In this document, "tread surface" means all of the points of the tread of a tyre which are likely to come into contact with the ground when the tyre is being driven on.

When using the term "radial", a distinction should be made between several different uses of the word by a person skilled in the art.

Firstly, the expression refers to a radius of the tyre. A "radial direction" is a direction that intersects the axis of rotation of the tyre and is perpendicular thereto. It is within this meaning that a point P1 is said to be "radially inside" a point P2 (or "radially on the inside" of the point P2) if it is closer to the axis of rotation of the tyre than the point P2. Conversely, a point P3 is said to be "radially outside" a point P4 (or "radially on the outside" of the point P4) if it is further away from the axis of rotation of the tyre than the point P4. Progress will be said to be "radially inwards (or outwards)" when it is in the direction of the smaller (or larger) radii. This sense of the term also applies when it is a matter of radial distances. In addition, the radius Rx from a point X of the tyre is the radial distance between the axis of rotation of said tyre and the point X.

Conversely, a thread or a reinforcement is said to be "radial" when the thread or the reinforcing elements of the reinforcement make an angle greater than or equal to 80° and less than or equal to 90° with the circumferential direction. Note that, in this document, the term "thread" should be understood in a very general sense and comprises threads in the form of monofilaments, multifilaments, a cord, a folded yarn or an equivalent assembly, irrespective of the material making up the thread or the surface treatment promoting its bonding with the rubber.

Finally, a "radial cross section" or "radial section" means here a cross section or a section in a plane which contains the axis of rotation of the tyre. A "radial or meridian plane" is a plane which contains the axis of rotation of the tyre.

An "axial" direction is a direction parallel to the axis of rotation of the tyre. A point P5 is said to be "axially inside" a point P6 (or "axially on the inside" of the point P6) if it is closer to the median plane of the tyre than the point P6. Conversely, a point P7 is said to be "axially outside" a point P8 (or "axially on the outside" of the point P8) if it is further away from the median plane of the tyre than the point P8.

The "median plane or equatorial plane" of the tyre is the plane which is perpendicular to the axis of rotation of the tyre and which is equidistant from the annular reinforcing structures of each bead. This plane divides the tyre into two substantially equal halves, that is to say passes through the middle of the tread.

A "circumferential direction" is a direction which is perpendicular both to a radius of the tyre and to the axial direction. This corresponds to the direction in which the tyre runs.

A "circumferential cross section" or "circumferential section" is a cross section or a section in a plane perpendicular to the axis of rotation of the tyre. A "circumferential plane" is a plane perpendicular to the axis of rotation of the tyre.

In order to make the description of the variants shown in the figures easier to read, the same references are used to denote identical structural elements.

FIG. 1 schematically shows a traditional tyre 10. The tyre 10 has a crown comprising a crown reinforcement (not visible in FIG. 1) surmounted by a tread 40, two sidewalls 30 extending the crown radially inwards, and two beads 20 radially inside the sidewalls 30.

Figure 2:
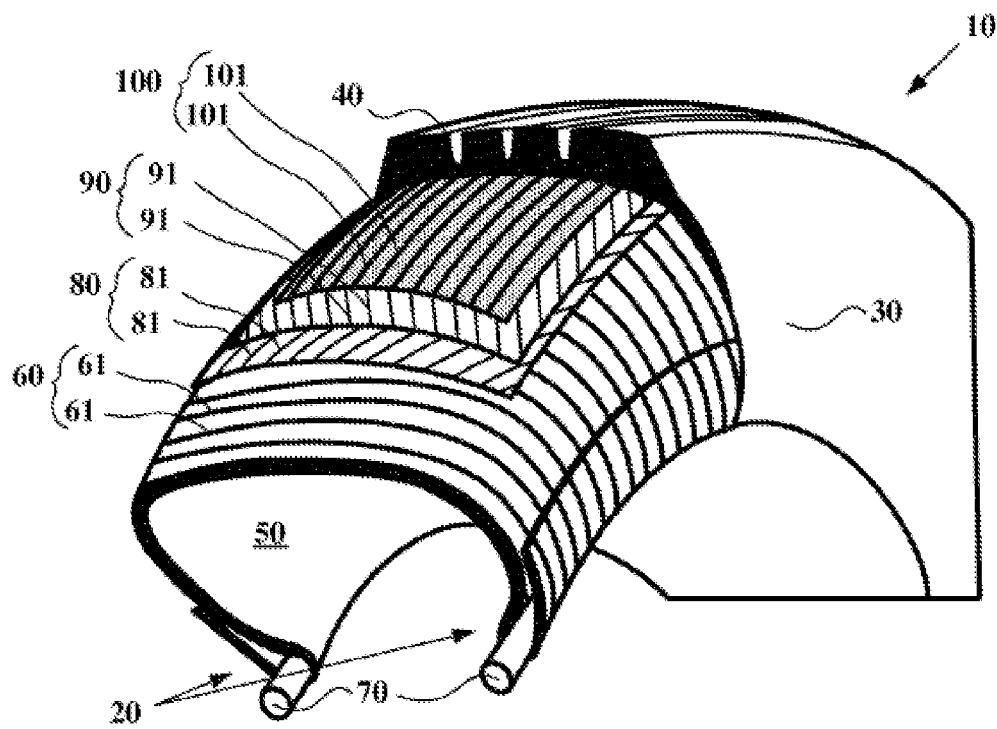
FIG. 2 shows a partial perspective view of the conventional tyre in FIG. 1.

FIG. 2 schematically shows a partial perspective view of a conventional tyre 10 and illustrates the various components of the tyre. The tyre 10 comprises a carcass reinforcement 60 made up of threads 61 coated with rubber composition, and two beads 20, each having a bead wire 70 which holds the tyre 10 on the rim (not shown). The carcass reinforcement 60 is anchored in each of the beads 20 by a turn-up. The threads 61 forming the carcass reinforcement 60 are in this case oriented substantially at 90° relative to the circumferential direction; the tyre described here is of the radial type.

The tyre 10 furthermore has a crown reinforcement, the crown reinforcement comprising, in the example in FIG. 2, two plies 80 and 90. Each of the plies 80 and 90 is reinforced by filamentary reinforcing elements 81 and 91 which are parallel in each layer and preferably crossed from one layer to another. The plies 80 and 90 are for example arranged such that the filamentary reinforcing elements make angles of between 10° and 70° with the circumferential direction.

The tyre also has a hoop reinforcement 100, positioned radially on the outside of the crown reinforcement, this hoop reinforcement being formed of reinforcing elements 101 that are oriented circumferentially and wound in a helix. A tread 40 is placed on the hoop reinforcement; it is this tread 40 which provides contact between the tyre 10 and the road.

The tyre 10 shown in FIG. 2 is a "tubeless" tyre: it comprises an "inner liner" 50 made of a rubber composition impermeable to the inflation gas, covering the inner surface of the tyre.

Figure 3:
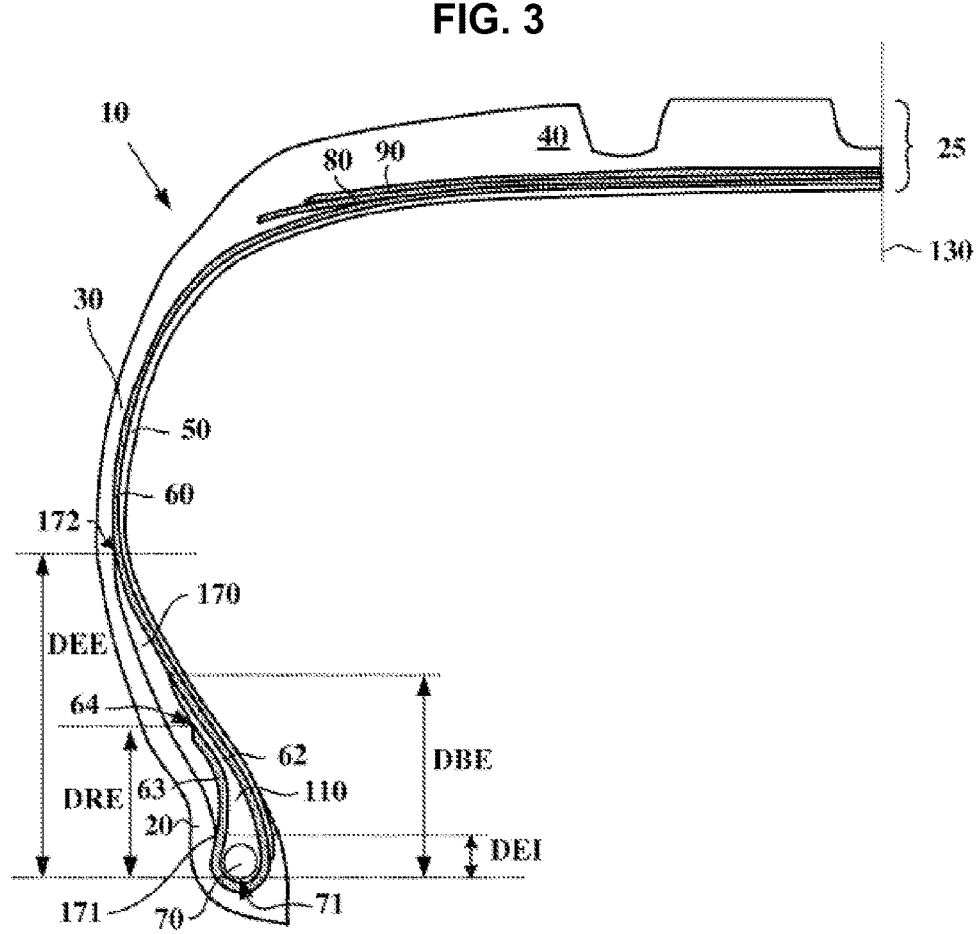
FIG. 3 shows, in radial cross section, a portion of a tyre according to the prior art.

FIG. 3 schematically shows, in radial cross section, a portion of a tyre 10 of the prior art, of the "Energy™ Saver" type sold by Michelin. The tyre 10 has two beads 20 intended to come into contact with a mounting rim (not shown), each bead 20 having a bead wire 70. Two sidewalls 30 extend the beads 20 radially outwards and meet in a crown 25 comprising a crown reinforcement formed of a first layer of reinforcing elements 80 and a second layer of reinforcing elements 90, and surmounted radially by a tread 40. Each layer comprises filamentary reinforcing elements coated in a matrix formed of rubber composition. The reinforcing elements of each layer are substantially parallel to one another; the reinforcing elements of the two layers are crossed from one layer to the other at an angle of around 20°, as is well known to a person skilled in the art for tyres referred to as radial tyres. The median plane of the tyre bears the reference 130.

The tyre 10 also has a carcass reinforcement 60 which extends from the beads 20 through the sidewalls 30 as far as the crown 25. This carcass reinforcement 60 in this case has filamentary reinforcing elements that are oriented substantially radially, that is to say make an angle greater than or equal to 80° and less than or equal to 90° with the circumferential direction. Preferentially, the filamentary reinforcing elements of the carcass reinforcement 60 form an angle of approximately 90° with the circumferential direction.

The carcass reinforcement 60 has a plurality of carcass reinforcing elements and is anchored in the two beads 20 by a turn-up around the bead wire 70 so as to form in each bead a main strand 62 and a turn-up strand 63. The turn-up strand extends radially outwards as far as an end 64 situated at a radial distance DRE from the radially innermost point 71 of the annular reinforcing structure of the bead.

Figure 4:
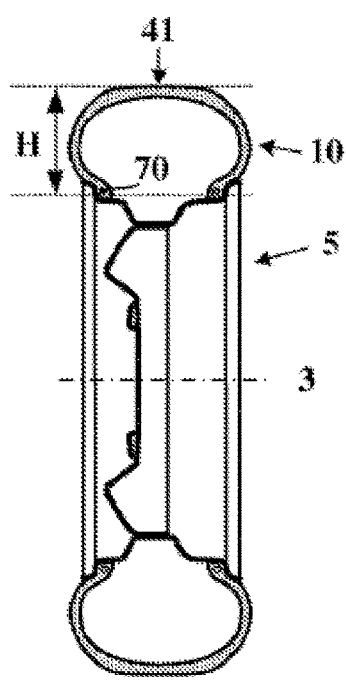
FIG. 4 illustrates how the height H of a tyre is determined.

The "radial height" H of a tyre is defined as the radial distance between the radially innermost point 71 of the annular reinforcing structure 70 of the bead 20 and the radially outermost point 41 (see FIG. 4) of the tread 40 when the tyre 10 is mounted on a mounting rim 5 (as shown in FIG. 4) and inflated to its service pressure.

Each bead has a filler 110, the filler being situated for the most part radially on the outside of the bead wire 70 and between the main strand 62 and the turn-up strand 63 of the carcass reinforcement 60. Here, the rubber composition used has an elastic modulus of 56 MPa.

Each bead furthermore has an outer layer or strip 170 positioned axially on the outside of the carcass reinforcement and the filler. The outer strip 170 extends radially outwards from a radially inner end 171 of the outer strip 170, situated at a distance DEI from the radially innermost point 71 of the bead wire 70, as far as a radially outer end 172 situated at a distance DEE from the radially innermost point 71 of the bead wire 70. In this instance, the distance DEI is equal to 6.5% and the distance DEE is equal to 41.5% of the radial height H of the tyre.

Figure 5:
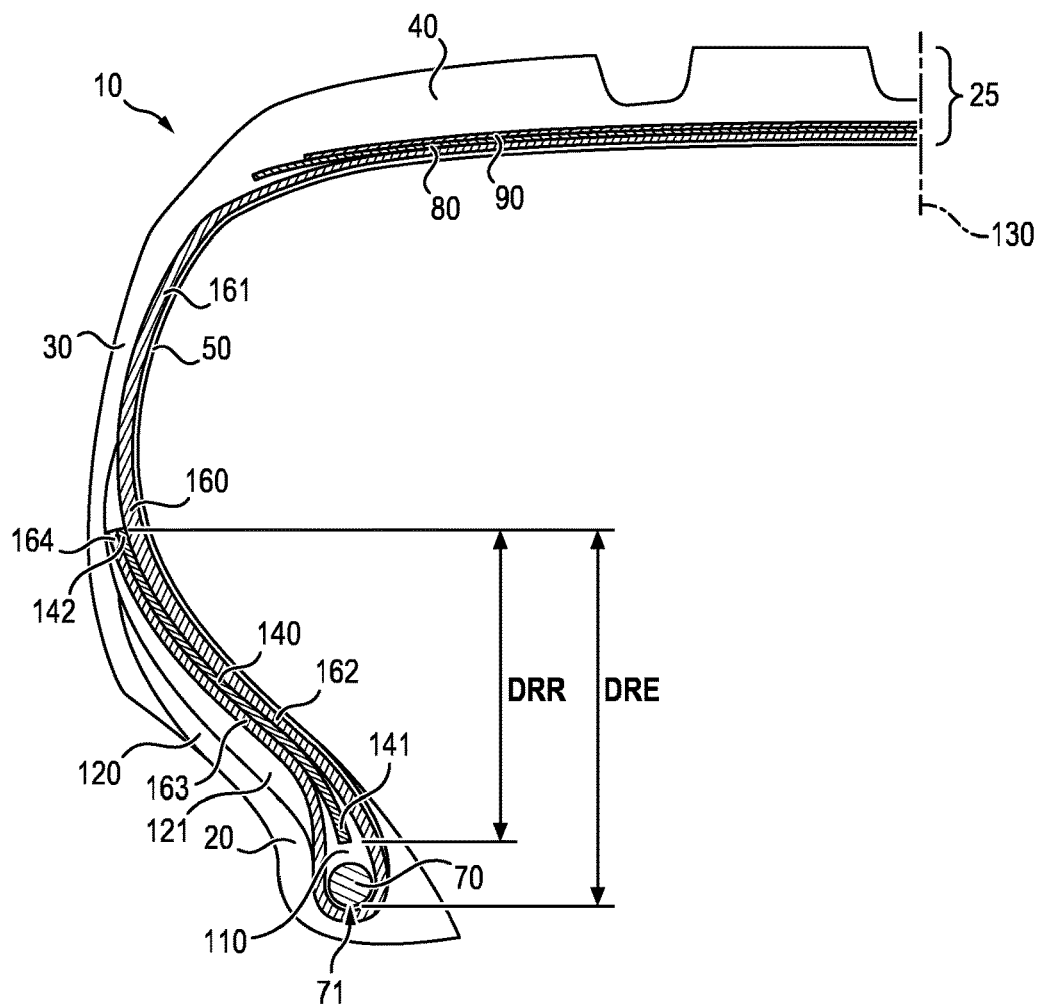
FIG. 5 shows, in radial cross section, a part of a tyre according to a first embodiment of the invention.

FIG. 5 illustrates a radial cross section through a tyre as proposed here in order to overcome the drawbacks mentioned in the preamble.

Conventionally and as already shown, the tyre 10 has two beads 20 (only one of which is shown) intended to come into contact with a mounting rim (not shown), each bead having a bead wire 70. The bead wire 70 has a radially innermost point 71. The two annular reinforcing structures 70 (only one of which is shown) define a median plane 130 of the tyre, which is perpendicular to the axis of rotation of the tyre (not shown) and equidistant from the annular reinforcing structures 70 of each bead. Two sidewalls 30 (only one of which is shown) extend the beads 20 radially outwards. The two sidewalls 30 meet in a crown 25 comprising a crown reinforcement formed by at least one ply, and preferably two plies 80 and 90, surmounted by a tread 40.

A carcass reinforcement 160 extends from the beads 20 through the sidewalls 30 as far as the crown 25, this carcass reinforcement 160 being formed by a plurality of carcass reinforcing elements.

The carcass reinforcement 160 is anchored in the two beads 20 by a turn-up around the bead wire 70 so as to form in each bead a main strand 162 and a turn-up strand 163. The turn-up strand 163 extends radially outwards as far as an end 164 situated at a radial distance DRE from the radially innermost point 71 of the bead wire 70.

It should be noted that the carcass reinforcement 160 may comprise additional carcass reinforcing elements which are not directly anchored in the beads 20. This is the case in particular if the carcass reinforcement 160 is formed by several carcass plies, which are for example superposed on one another.

The radial distance DRE is for example greater than 10% and less than or equal to 95% of the radial height H of the tyre. However, the radial distance DRE is preferably greater than 20% and less than or equal to 95% of the radial height H of the tyre. More preferably, the radial distance DRE is greater than 20% and less than or equal to 90% of the radial height H of the tyre. According to a preferred embodiment, the radial distance DRE is greater than 25% of the radial height H of the tyre. Even more preferentially, the radial distance DRE is between 40% and 60% of the radial height H of the tyre, and even more preferably the radial distance DRE is approximately 50% of the radial height H of the tyre.

Advantageously, at least a portion of the carcass reinforcement 160 comprises crossed reinforcing elements oriented at an angle of between 70° and 85° relative to the circumferential direction, preferably at an angle of between 70° and 80° relative to the circumferential direction, and more preferably at an angle of between 75° and 80° relative to the circumferential direction. A "crossed reinforcing element" means an element which is not considered to be a radial element relative to the circumferential direction.

Preferably, the crossed reinforcing elements of the carcass reinforcement 160 are oriented at an angle of approximately 75° or 80°, or even of exactly 75° or 80°, relative to the circumferential direction. An "angle of approximately X degrees" means an angle of which the value can be between plus or minus 5% of the value of X degrees.

This carcass reinforcement 160 having specific crossed reinforcing elements is combined with a stiffening reinforcement 140, which is arranged in at least one of the two sidewalls 70 of the tyre, and preferably in both sidewalls 70 of the tyre. More specifically, a stiffening reinforcement 140 extending between a radially inner end 141 and a radially outer end 142 and formed of a plurality of stiffening elements oriented at an angle less than or equal to 10° relative to the circumferential direction of the tyre is provided. Preferably, the stiffening elements are oriented at a zero angle or a small angle (of a few degrees, for example less than 5 degrees) relative to the circumferential direction.

This specific combination will make it possible to reduce or even eliminate the use of rigid rubber in the lower zone of the tyre, that is to say in the zone extending from the bead 20 as far as at most halfway up the sidewall 30. Furthermore, this combination provides the stiffness required for the tyre, both the lateral stiffness and the cornering stiffness.

Preferably, the proposed stiffening reinforcement 140 is arranged such that the radial distance DRR between the radially inner end 141 and the radially outer end 142 is at least equal to 10% of the distance DRE from the turn-up strand of the corresponding sidewall. Preferably, the distance DRR is between 10% and 70% of the distance DRE.

The radial distance DRR may also be defined depending on the radial height H of the tyre. The radial distance DRR may for example be at least equal to 5% of the radial height H of the tyre, or even at least equal to 10% of the radial height H of the tyre. Preferably, the distance DRR is between 10% and 70% of the radial height H.

The radial distance DRR may for example be at least equal to 10 mm, preferably between 10 mm and 70 mm.

In addition, this stiffening reinforcement 140 is furthermore preferably arranged so as to be at least partially adjacent to the turn-up strand 163 of the corresponding sidewall 30, such that the cooperation of the stiffening reinforcement 140 with the carcass reinforcement 160 is more efficient.

The reinforcing elements forming the main strand 162 and the turn-up strand 163 of the carcass reinforcement 160 are preferably embedded in at least one first rubber composition 120, which has the particular feature of having a low elastic modulus. It is possible for example to consider a first rubber composition having a modulus MA10 of less than or equal to 20 MPa, and preferably less than or equal to 10 MPa, it being understood that the modulus MA10 is, for a given rubber, the value of the tensile modulus measured for a relative elongation of 10% of this rubber at a temperature of 23° C. in the 2nd measurement cycle.

The stiffening elements of the stiffening reinforcement 140 are for their part embedded in a second rubber composition 121, which is also of low elastic modulus. Preferentially, the second rubber composition is identical to the first rubber composition. The second rubber composition 121 may for example have a modulus MA10 of less than or equal to 10 MPa, preferably between 2 MPa and 6 MPa.

According to a particular example, as shown in FIG. 5, the second rubber composition 121 used to embed the stiffening elements of the stiffening reinforcement 140 is also used to form the filler 110 in the turn-up zone formed by the main strand 162 and the turn-up strand 163 of the carcass reinforcement 160 around the bead wire 70.

According to a preferred embodiment, the crossed reinforcing elements of the carcass reinforcement 160 are arranged so as to form the turn-up strand 163 and/or at least a portion of the main strand 162.

For example, the crossed reinforcing elements of the carcass reinforcement 160 are arranged so as to form the turn-up strand 163 and the portion of the main strand 162 that is adjacent to said turn-up strand 163.

In such a case, it may be advantageous for the portion 161 of the main strand 162 that is not adjacent to said turn-up strand 163, that is to say the portion 161 of the main strand 162 situated in the upper zone of the sidewall 30 of the tyre, to be formed of non-crossed reinforcing elements oriented at an angle of approximately 90° relative to the circumferential direction.

According to a particular embodiment, the carcass reinforcement 160 comprises crossed reinforcing elements oriented at opposite angles relative to the circumferential direction.

Figure 10:
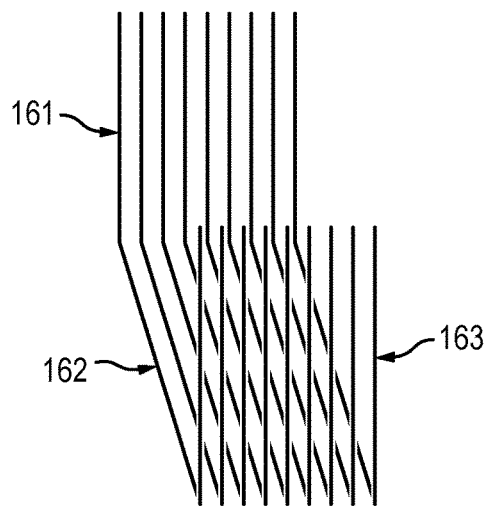
FIG. 10 is a schematic depiction of a second arrangement of the reinforcing elements of a carcass reinforcement forming the main strand and the turn-up strand.

FIG. 10 illustrates an exemplary embodiment in which the crossed reinforcing elements of the carcass reinforcement 160 form the lower part of the main strand 162, while the turn-up strand 163 and the portion 161 of the main strand 162 situated in the upper zone of the sidewall 30 of the tyre are formed by non-crossed reinforcing elements oriented at an angle of approximately 90° relative to the circumferential direction.

Figure 11:
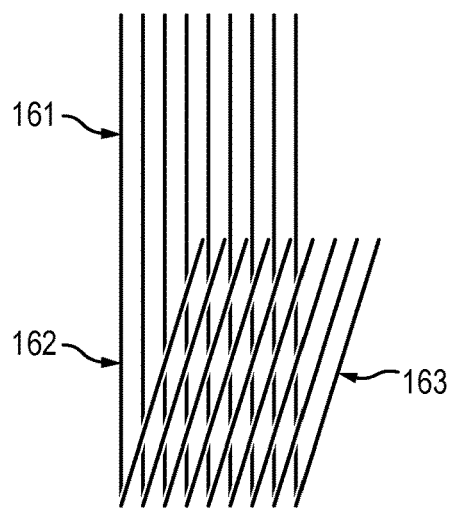
FIG. 11 is a schematic depiction of a third arrangement of the reinforcing elements of a carcass reinforcement forming the main strand and the turn-up strand.

FIG. 11 illustrates another exemplary embodiment, in which the crossed reinforcing elements of the carcass reinforcement 160 form the turn-up strand 163, while all of the main strand 162, both in the lower part and in the upper part 161, is formed by non-crossed reinforcing elements oriented at an angle of approximately 90° relative to the circumferential direction.

Figure 9:
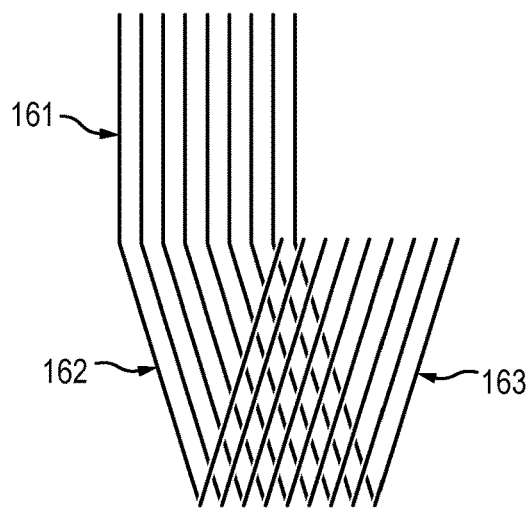
FIG. 9 is a schematic depiction of a first arrangement of the reinforcing elements of a carcass reinforcement forming the main strand and the turn-up strand.

FIG. 9 illustrates yet another exemplary embodiment, in which the crossed reinforcing elements of the carcass reinforcement 160 form both the lower part of the main strand 162 and the turn-up strand 163, while the portion 161 of the main strand 162 situated in the upper zone of the sidewall 30 of the tyre is formed by non-crossed reinforcing elements oriented at an angle of approximately 90° relative to the circumferential direction.

The stiffening reinforcement 140 may be positioned in various arrangements relative to the strands forming the carcass reinforcement 160.

Figure 6:
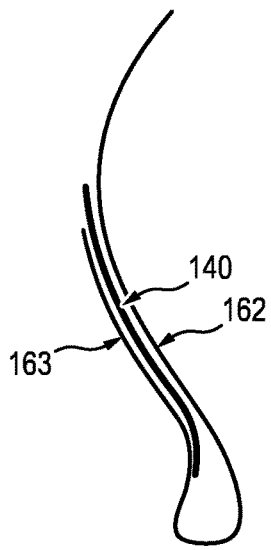
FIG. 6 is a schematic depiction of the positioning of a stiffening reinforcement relative to a carcass reinforcement of a tyre according to a second embodiment of the invention.

According to a first possible arrangement, the stiffening reinforcement 140 is in fact positioned axially between the main strand 162 and the turn-up strand 163 of the corresponding sidewall 30, as shown in FIGS. 5 and 6.

Figure 7:
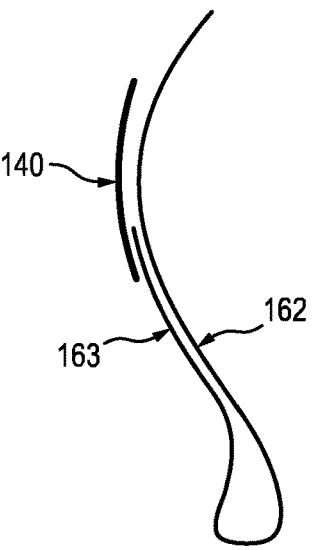
FIG. 7 is a schematic depiction of the positioning of a stiffening reinforcement relative to a carcass reinforcement of a tyre according to a third embodiment of the invention.

According to a second possible arrangement, the stiffening reinforcement 140 is positioned axially on the outside relative to the turn-up strand 163 of the corresponding sidewall 30, as shown in FIG. 7.

Figure 8:
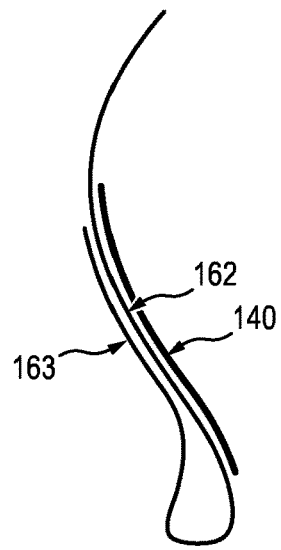
FIG. 8 is a schematic depiction of the positioning of a stiffening reinforcement relative to a carcass reinforcement of a tyre according to a fourth embodiment of the invention.

According to a third possible arrangement, the stiffening reinforcement 140 is positioned axially on the inside relative to the main strand 162 of the corresponding sidewall 30, as shown in FIG. 8.

According to the positioning in FIG. 5, the stiffening reinforcement 140 is arranged so as to be entirely adjacent to the turn-up strand 163 of the corresponding sidewall 30. It may however be conceivable for it to be only partially adjacent to the turn-up strand 163, as is the case in FIGS. 6, 7 and 8, in which case the stiffening reinforcement 140 extends beyond said turn-up strand 163. According to another exemplary embodiment, which is not shown, the stiffening reinforcement 140 is arranged so as not to be adjacent to the turn-up strand 163 of the corresponding sidewall 30, meaning that it would be adjacent only to the portion 161 of the main strand 162 that is not adjacent to said turn-up strand 163.

The stiffening elements used to form the stiffening reinforcement 140 may comprise metallic or textile cords, or may even be formed only by metallic cords or only by textile cords.

According to another embodiment, the stiffening elements of the stiffening reinforcement 140 comprise textile and/or metallic threads. The threads forming preferably have a section with a diameter of less than 1 mm, for example approximately 0.7 mm to 0.8 mm.

The stiffening elements may for example be in the form of strips, such as textile or metallic strips. According to a particular example, the strips used have a thickness of approximately 1 mm and a width of approximately 10 mm.

It may be advantageous for the stiffening elements to be split, this in particular making it easier to manufacture the tyre. This is particularly the case when the stiffening elements forming the stiffening reinforcement 140 are in the form of bands/strips.

The splitting of the stiffening elements may be carried out by a mechanical cutting process or by cutting using a laser-type means.

The stiffening reinforcement (140) may also comprise several layers of bands, which are in particular superposed on one another, in order to increase the stiffness of the stiffening reinforcement.

The threads forming the textile are for example manufactured from a non-elastomeric material chosen from a polyester, a polyamide, a polyketone, a polyvinyl alcohol, a cellulose, a mineral fibre, a natural fibre or a mixture of these materials.

Among polyesters, mention will be made of polyethylene terephthalate (PET), polyethylene naphthalate (PEN), polybutylene terephthalate (PBT), polybutylene naphthalate (PBN), polypropylene terephthalate (PPT) or polypropylene naphthalate (PPN). Among polyamides, mention will be made of an aliphatic polyamide such as nylon or an aromatic polyamide such as aramid. Among polyvinyl alcohols, mention will be made of Kuralon®. Among celluloses, mention will be made of rayon. Among mineral fibres, mention will be made of glass fibres and carbon fibres. Among natural fibres, mention will be made of hemp or flax fibres.

According to a specific embodiment, the stiffening elements forming the stiffening reinforcement 140 are spaced apart by a regular pitch, preferably a pitch of approximately 1 mm.

When the tyre is manufactured according to a process with shaping, whether the shaping is carried out during the building of the casing or directly in the press, the stiffening elements forming the stiffening reinforcement 140 are preferably laid flat during the building of the tyre, before shaping.

For example, instead of depositing a rigid rubber as conventionally used in the bead wire filler, either split textile bands or unitary threads, which are not cut but undulated, are wound, as during the laying of a crown hooping ply.

Figure 12:
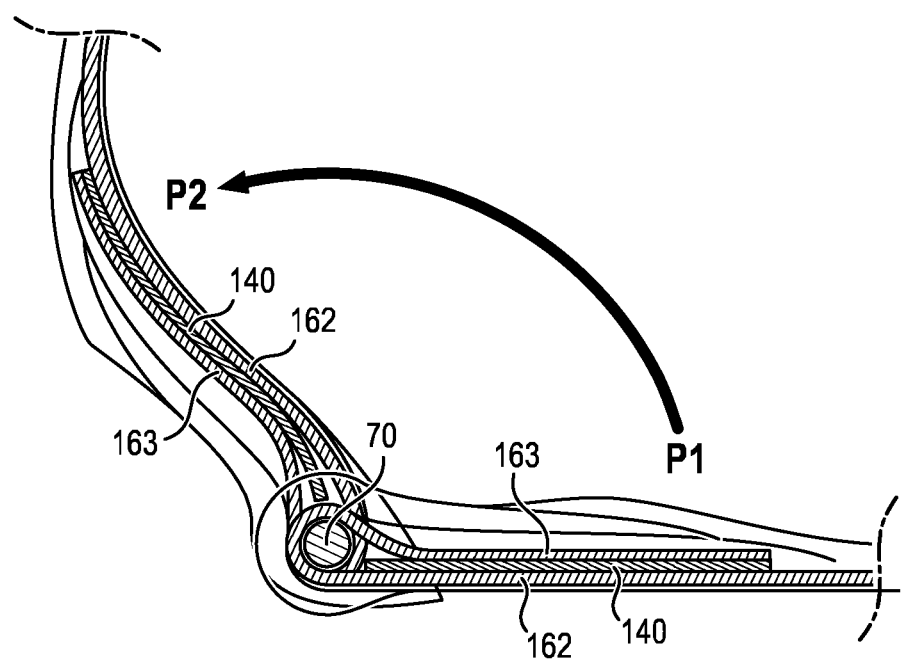
FIG. 12 is a schematic depiction of a tyre before and after shaping.

The splitting of the textile bands or the undulation of the laid unitary threads makes the subsequent shaping easier, that is to say the change from the flat position P1 before shaping to the shaped position P2 having a larger radius (see FIG. 12).

With certain methods for producing the tyre, the lower zone may be constructed or assembled in a geometric state close to its final shape; the stiffening elements forming the stiffening reinforcement 140 may then be wound during or before the manufacture of the tyre in a position very close to the final position once the tyre has been cured. In these cases, splitting of the bands is not necessary.

BIBLIOGRAPHIC REFERENCES

WO2011/067211
WO2013/127680
WO2014/019939

The invention claimed is:

1. A tire for a motor vehicle comprising:
   two beads intended to come into contact with a mounting rim, each bead comprising at least one annular reinforcing structure, each annular reinforcing structure having a radially innermost point;
   two sidewalls extending the beads radially outward, the two sidewalls meeting at a crown comprising a crown reinforcement having at least one ply provided with crown reinforcing elements, the crown reinforcement being furthermore surmounted by a tread;
   at least one carcass reinforcement extending from the beads through the sidewalls as far as the crown, the carcass reinforcement having a plurality of carcass reinforcing elements and being anchored in the two beads by a turn-up around the at least one annular reinforcing structure, so as to form in each bead a main strand and a turn-up strand; and
   a stiffening reinforcement arranged in at least one sidewall, the stiffening reinforcement having a radially inner end and a radially outer end, the stiffening reinforcement being formed of a plurality of stiffening elements oriented at an angle less than or equal to 10° relative to a circumferential direction of the tire,
   wherein each turn-up strand of the carcass reinforcement extends radially outward as far as an end situated at a radial distance DRE from the radially innermost point of the at least one annular reinforcing structure of the bead, the radial distance DRE being greater than 20% and less than or equal to 95% of a radial height H of the tire,
   wherein the carcass reinforcement comprises crossed reinforcing elements oriented at an angle of between 70° and 80° relative to the circumferential direction and non-crossed reinforcing elements oriented at an angle of approximately 90° relative to the circumferential direction, the crossed reinforcing elements of the carcass reinforcement being radially inside the radially outer end of the stiffening reinforcement, wherein the crossed reinforcing elements of the carcass reinforcement are arranged so as to form a portion of the main strand that is adjacent to the turn-up strand or both the turn-up strand and a portion of the main strand that is adjacent to the turn-up strand, wherein when the crossed reinforcing elements form a portion of the main strand and the turn-up strand, the crossed reinforcing elements of the turn-up strand are oriented at the same angle with respect to the circumferential direction from the radially inner end of the turn-up strand to the radially outer end of the turn-up strand, wherein when the crossed reinforcing elements form a portion of the main strand and the turn-up strand, the crossed reinforcing elements of the main strand are oriented at angles that are opposite to angles of crossed reinforcing elements of the turn-up strand relative to the circumferential direction, and wherein the stiffening reinforcement is arranged such that a radial distance DRR between the radially inner end and the radially outer end is at least equal to 10% of the radial distance DRE from the turn-up strand of a corresponding sidewall.

2. The tire of claim 1, wherein the crossed reinforcing elements of the carcass reinforcement are oriented at an angle of between 75° and 80° relative to the circumferential direction.

3. The tire of claim 1, wherein the stiffening reinforcement is positioned axially between the main strand and the turn-up strand of the corresponding sidewall.

4. The tire of claim 1, wherein the stiffening reinforcement is positioned axially on the outside relative to the turn-up strand of the corresponding sidewall.

5. The tire of claim 1, wherein the stiffening reinforcement is positioned axially on the inside relative to the main strand of the corresponding sidewall.

6. The tire of claim 1, wherein the stiffening reinforcement is arranged so as to be at least partially adjacent to the turn-up strand of the corresponding sidewall.

7. The tire of claim 1, wherein the stiffening reinforcement is arranged so as to be entirely adjacent to the turn-up strand of the corresponding sidewall.

8. The tire of claim 1, wherein the stiffening reinforcement is arranged so as not to be adjacent to the turn-up strand of the corresponding sidewall.

9. The tire of claim 1, wherein the stiffening elements of the stiffening reinforcement are embedded in a rubber composition having a modulus MA10 of less than 10 MPa.

10. The tire of claim 1, wherein the stiffening elements are oriented at an angle of approximately zero degrees relative to the circumferential direction of the tire.

11. A tire for a motor vehicle comprising:
two beads intended to come into contact with a mounting rim, each bead comprising at least one annular reinforcing structure, each annular reinforcing structure having a radially innermost point;
two sidewalls extending the beads radially outward, the two sidewalls meeting at a crown comprising a crown reinforcement having at least one ply provided with crown reinforcing elements, the crown reinforcement being furthermore surmounted by a tread;
at least one carcass reinforcement extending from the beads through the sidewalls as far as the crown, the carcass reinforcement having a plurality of carcass reinforcing elements and being anchored in the two beads by a turn-up around the at least one annular reinforcing structure, so as to form in each bead a main strand and a turn-up strand; and
a stiffening reinforcement arranged in at least one sidewall, the stiffening reinforcement having a radially inner end and a radially outer end, the stiffening reinforcement being formed of a plurality of stiffening elements oriented at an angle less than or equal to 10° relative to a circumferential direction of the tire,
wherein each turn-up strand of the carcass reinforcement extends radially outward as far as an end situated at a radial distance DRE from the radially innermost point of the at least one annular reinforcing structure of the bead, the radial distance DRE being greater than 20% and less than or equal to 95% of a radial height H of the tire,
wherein the carcass reinforcement comprises crossed reinforcing elements oriented at an angle of between 70° and 80° relative to the circumferential direction and non-crossed reinforcing elements oriented at an angle of approximately 90° relative to the circumferential direction, the crossed reinforcing elements of the carcass reinforcement being radially inside the radially outer end of the stiffening reinforcement,
wherein the crossed reinforcing elements comprise both the turn-up strand and a portion of the main strand that is adjacent to the turn-up strand,
wherein the crossed reinforcing elements of the main strand are oriented at angles that are opposite to angles of crossed reinforcing elements of the turn-up strand relative to the circumferential direction,
wherein the crossed reinforcing elements of the turn-up strand are oriented at the same angle with respect to the circumferential direction from the radially inner end of the turn-up strand to the radially outer end of the turn-up strand, and
wherein the stiffening reinforcement is arranged such that a radial distance DRR between the radially inner end and the radially outer end is at least equal to 10% of the radial distance DRE from the turn-up strand of a corresponding sidewall.

* * * * *